Jan. 13, 1925.　　　　　　　　　　　　　　　　　　1,522,540
J. F. O'CONNOR
FRICTION SHOCK ABSORBING MECHANISM
Filed Aug. 2, 1923
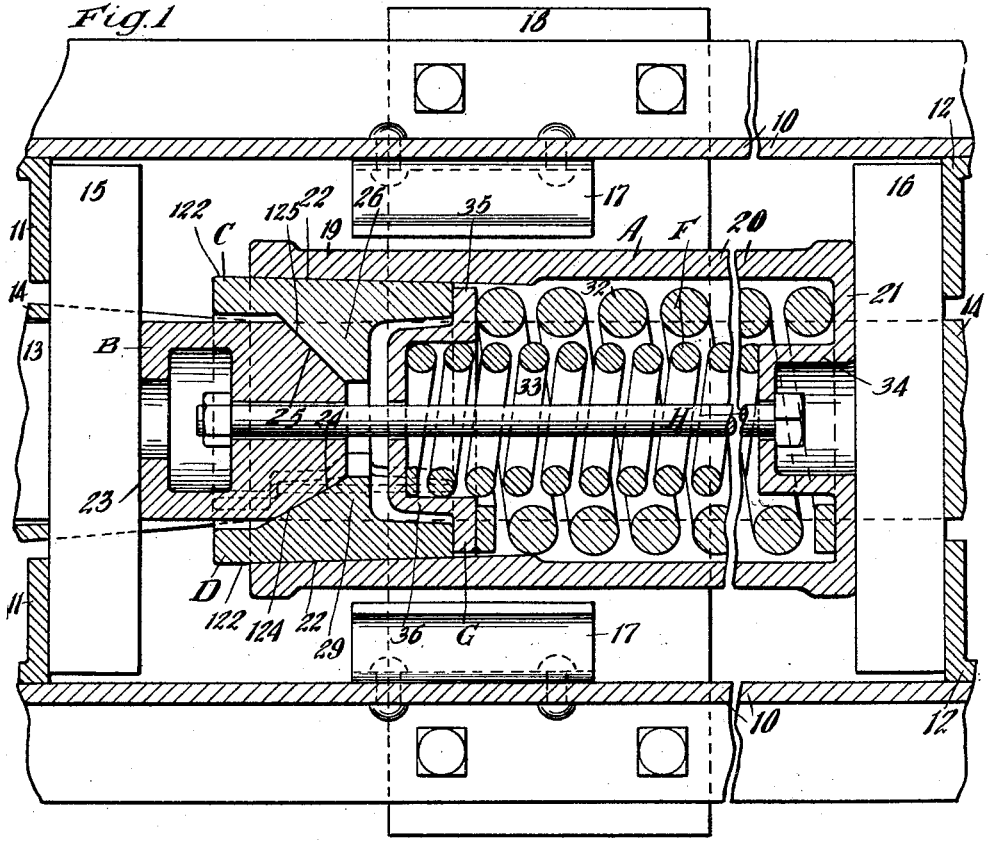
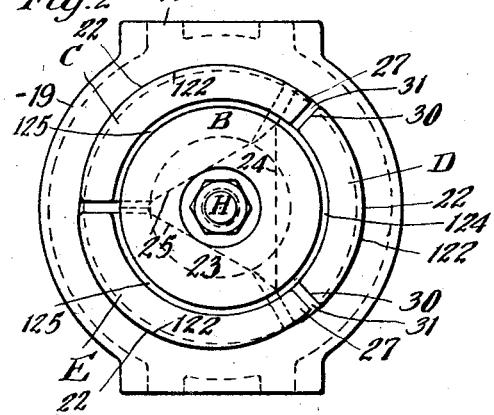
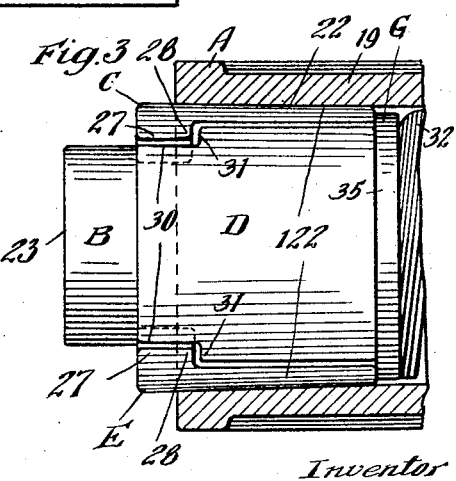
Witnesses
Wm. Geiger
Inventor
John F. O'Connor
By George F. Haight
His Atty.

Patented Jan. 13, 1925.

1,522,540

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 2, 1923. Serial No. 655,233.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in Friction Shock Absorbing Mechanisms.

One object of the invention is to provide a friction shock absorbing mechanism of that type adapting it to cushioning extremely heavy shocks under high speed and more particularly such a mechanism which is especially adapted for railroad draft riggings.

Another object of the invention is to provide a mechanism of the character indicated, capable of use wherein heavy shocks are to be cushioned, including railway draft riggings and wherein is obtained high frictional capacity, combined with assured release, the arrangement being such that high frictional capacity is developed during the compression stroke, by a system of wedge and friction elements having the attributes of a keen angle system, wherein after an initial action during which the necessary radial forces have been built up to develop the desired friction, a further increase of the wedging action due to the keen angled element is avoided.

More specifically, an object of the invention is to provide a mechanism of the character indicated wherein are employed a pressure transmitting wedge and a plurality of wedge friction shoes co-operable therewith, wherein some of the engaging faces of the wedge and shoes are keener than others, and in which the shoes having keener wedge faces, after effecting a preliminary action of the mechanism, are engaged by and moved bodily longitudinally, inwardly of the friction shell with the remaining shoes.

Other objects and advantages of the invention will more clearly appear from the description and claims hereinafter following.

In the drawing forming a part of this specification, Figure 1 is a horizontal, sectional view of a portion of a railway draft rigging, the section through the shell and friction elements therewithin corresponding to the two section planes at approximately 120° apart. Figure 2 is a front end elevational view of the shock absorbing mechanism proper, and Figure 3 is a longitudinal, vertical, sectional view through the front end of the shell, showing the friction shoes and wedge in side elevation.

In said drawings, 10—10 denote the usual draft or center sills of a car under-frame, said sills being preferably of channel cross-section, and to the inner faces of which are secured front stop lugs 11—11 and rear stop lugs 12—12. A portion of the draw-bar is indicated at 13, the same having operatively associated therewith a hooded cast yoke 14, of well known form and within which is disposed the shock absorbing mechanism proper, hereinafter described, a front main follower 15, and a rear main follower 16. The friction shock absorbing mechanism proper, illustrated in the drawings is that type employing a substantially cylindrical combined friction shell and cage and in order that it be maintained in proper centered position, the draft sills 10 may have secured to the inner faces thereof, guide plates 17—17. The yoke and parts contained therein are supported in operative position by a detachable saddle plate 18.

The improved shock absorbing mechanism proper, as shown, comprises a combined friction shell and spring cage casting A; a pressure transmitting wedge B; three friction shoes C, D and E; a spring resistance F; a spring follower cap G; and a retainer bolt H.

The casting A is of generally cylindrical form having the friction shell proper 19 thereof formed at the open or front end. Rearwardly of the friction shell proper, the casting provides a cylindrical spring cage or casing 20 and at its rear end, the casting A has an integral transverse wall 21 bearing on the rear follower 16. The friction shell proper 19 is preferably of the following formation, as best illustrated in Figures 1 and 2. The interior of the shell 19, while of generally cylindrical formation is preferably comprised of three true cylindrical surfaces 22—22 symmetrically arranged around the axis and each approximately 120° in extent. Said cylindrical surfaces 22 are converged inwardly of the shell on a relatively slight taper and in such a manner that the inner ends of said three cylindrical surfaces 22 form a true circle. With this arrangement, the friction shoes which have true cylindrical surfaces, as hereinafter described, will maintain true surface contact, as distinguished from line contact with the shell, in all positions during the compression stroke.

The wedge B through which the pressure is transmitted, is in the form of a hollow casting having a front transverse bearing surface 23 engaging the front follower 15. At its rear end, said wedge B is provided with a true wedge face 24 and two other rearwardly converged inclined faces 25—25, all of said faces 24 and 25 being disposed around the center of the axis of the wedge, giving the wedge the appearance of a truncated, somewhat irregular triangular pyramid. It will be noted from inspection of Figures 1 and 2, that the three inclined faces 24 and 25 are so disposed that, a transverse section taken through the wedge B intersects all three faces.

The two friction shoes C and E, preferably in the form of castings are of like construction, each having an outer friction surface 122 which corresponds to a portion of a true cylindrical surface and which extends through an arc of approximately 120°. On its inner side, that is, the side nearest the axis of the shell, each shoe C and E is provided with a lateral enlargement 26 on the front side of which is provided a rearwardly and inwardly inclined face 125 corresponding in angle to and co-operating with one of the inclined faces 25 as clearly shown in Figures 1 and 2. Each of the shoes C and E is also provided with a lug 27 at the forward end portion thereof projecting laterally from the edge adjacent the shoe D, thereby presenting a transverse shoulder 28. The lugs 27 as clearly shown in Figure 2 are curved to correspond with the curvature of the shoes.

The third or remaining shoe D is provided with a similar outer cylindrical friction surface 122 and on its inner side with an inwardly projecting enlargement 29 having an inclined wedge face 124 corresponding in angle to and co-acting with the true wedge face 24 of the wedge B. The faces 125 and 124 of the shoes are so disposed that the front ends of the shoes will normally lie flush with each other at a point outside of the end of the shell.

At the front end, the opposite side edges of the shoe D are cut away along lines radial to the axis of the mechanism thereby providing inwardly extending side edges 30 and transverse shoulders 31, the shoulders 31 being adapted to co-operate with the shoulders 28 on the shoes C and E.

The spring resistance F, as shown, comprises an outer heavy coil 32 bearing at its inner end against the wall 21 of the casing A and an inner lighter coil 33 bearing at its inner end upon a hollow cup-like boss 34 formed integral with the wall 21.

The spring follower or cap G is more or less cup-shape, having an angular flange 35 on the inner side of which is adapted to bear the front end of the outer coil 32. Said spring follower or cap G has a forward extended integral cup-shape section 36, the interior of which provides a bearing for the front end of the inner coil 33.

The retainer bolt H is anchored at its rear end within the boss 34 and at its forward end within a suitable recess provided within the wedge B, the latter and the spring follower G being suitably apertured to accommodate the shank of the bolt. Said bolt not only serves to maintain the parts assembled, but is also utilized to adjust the parts to proper over all length and maintain in this position when under full release.

Assuming a buffing or compressive action applied to the draft rigging, the operation is as follows: As the wedge B is forced inwardly of the shell, there will be, initially, a slight movement of the wedge B inwardly in respect to the keen angle shoe D due to the inertia of the shoe and the fact that, on account of the relatively keen angle slippage of the faces 24 and 124 is possible. During this initial action, the two blunt angle shoes C and E will move longitudinally inwardly of the shell, substantially in unison with the wedge B on account of the blunt angle of the corresponding faces 25 and 125, thus advancing the shoes C and E longitudinally ahead of the keen angle shoe, until the shoulders 28 of the shoes C and E engage with the shoulders 31 of the shoe D, whereupon the shoe D will be moved rearwardly in unison with the shoe C and E. During the foregoing described initial action, the desired pronounced spreading action is set up. It will be evident however, that due to engagement of the shoulders 28 and 31 of the shoes, further increase of the spreading action due to the co-operating faces 24 and 124 will be avoided after the initial action described.

Due to the taper of the shell surfaces, there must be a relative lateral approach of the shoes, which is permitted by the shoes C and E moving radially inward with respect to the wedge B; the slippage occurring on the blunt angle faces 25 and 125, and the shoe D also moving inwardly with respect to the wedge B, the slippage occurring on the keen faces 24 and 124. The blunt angle faces 25 and 125 also act as a sort of a "safety valve" during this time to prevent bursting of the shell. The differential action thus produced further advances the shoes C, D and E longitudinally of the shell, thereby placing the spring resistance under additional compression. During the compression stroke as above described due to the initial advance of the shoes C and E relative to the shoe D, the spring follower or cap G will be displaced or removed from the inner end of the shoe D. While the spring follower or cap G is out of engagement with the inner end of the keen angle shoe D during the compression stroke, as above described, nevertheless, it will be apparent that the shoe D always affords resistance because of the friction between the surface 122 thereof and the shell surface 22, this friction acting to retard the shoe D with gradually increasing force always during the compression stroke. The friction shell being of metal, preferably malleable iron, is capable of a limited amount of radial expansion which takes pace during the compression of the mechanism. With the degree of taper hereinbefore referred to, the expansion of the shell cannot neutralize the taper, therefore a differential action is assured.

Upon the removal of the actuating or compressing force, there is an initial releasing action induced by the radial inward contraction of the shell. These forces produce a relative approach toward the central line of the mechanism of all three shoes and which, in turn, causes the pressure transmitting wedge B to be squeezed out from between the shoes, said action being facilitated by reason of the blunt angle faces 25 and 125 on the wedge and blunt shoes, respectively, it being observed that the faces 25 and 125 now act substantially as true wedge faces with respect to the radial inward contracting forces. The contraction of the shell continues until the same has either resumed its normal condition or until the contracting forces have been reduced to a point where the stored up energy in the spring exceeds the longitudinal resistance to release the same. The initial release action, just described, results in loosening the wedge B sufficiently to permit the reduction of the pressure between the friction surfaces of the various shoes, and the shell friction surfaces, whereupon the spring becomes effective to commence moving all of the friction elements outwardly of the shell at the beginning of the outward movement just referred to, the spring follower cap G will obviously move the two blunt angle shoes C and E in an outward direction moving the shoulders 28 away from the shoulders 31 and in turn, picking up the wedge B sufficiently to loosen the keen angle wedge faces 24 and 124, so that immediately thereafter the flange of the spring follower or cap G will pick up the inner end of the keen angle shoe D and also move it out longitudinally. The outward movement referred to continues until the wedge B is limited against further movement by the bolt H. The three shoes will then be forced into their normal position and come to rest with the shoulders 28 and 31 properly spaced apart and with their inner ends flush, as best shown in Figures 1 and 3.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having interior friction surfaces arranged circularly; of a series of friction shoes within and cooperable with said shell and arranged in a circular series; a spring resistance; spreader means cooperable with said shoes, said shoes and spreader means having a plurality of co-operating sets of faces, part of which are arranged at a relatively keen wedge acting angle and others at a relatively blunt releasing angle; and means for causing all of said shoes to move longitudinally inwardly of the shell in unison after a pre-determined spreading action of said shoes.

2. In a friction shock absorbing mechanism, the combination with a friction shell having interior friction surfaces arranged circularly; of a series of friction shoes within and cooperable with said shell and arranged in a circular series; a spring resistance; spreader means cooperable with said shoes, said shoes and spreader means having a plurality of co-operating sets of faces, part of which are arranged at a relatively keen wedge acting angle and others at a relatively blunt releasing angle, said spreader means comprising a single pressure transmitting block; and means for moving all of said shoes in unison longitudinally inwardly of the shell after a predetermined inward movement of said spreader means.

3. In a friction shock absorbing mechanism, the combination with a friction shell having interior friction surfaces arranged circularly, said shell friction surfaces being converged inwardly of the shell; of friction shoes co-operable with said shell and arranged in a circular series therewithin; a spring resistance; spreader means cooperable with said shoes, said shoes and spreader means having a plurality of co-operating sets of faces, part of which are arranged at a relatively keen wedge acting angle with respect to the forces applied substantially parallel to the axis of the mechanism and others at a relatively blunt releasing angle; and coacting means on said shoes operative after a predetermined relative movement thereof for effecting simultaneous longitudinal movement of all of said shoes inwardly of the shell.

4. In a friction shock absorbing mechanism, the combination with a friction shell having interior, inwardly converged friction surfaces, said surfaces being arranged circularly; of a plurality of friction shoes cooperable with said shell friction surfaces and arranged in a circular series; a spring resistance; a pressure transmitting wedge disposed between and cooperating with said shoes, one of said shoes and the wedge having cooperating faces extending at a relatively acute wedging angle with respect to the axis of the mechanism and another friction shoe and the wedge having co-operating faces inclined at a relatively blunt angle with respect to said axis, said blunt shoes having abutment means thereon normally spaced from and adapted to engage said acute angle shoe for moving the latter longitudinally inwardly of the shell; and a spring follower interposed between said springs and shoes.

5. In a friction shock absorbing mechanism, the combination with a friction member having longitudinally extending friction surfaces; of a plurality of friction shoes cooperable with the surfaces of said member; a spring resistance; and a pressure wedge member cooperable with said shoes, one of said shoes and wedge member having coacting sets of faces arranged at a keen relatively wedge acting angle during compression, another shoe and said pressure wedge member having coacting faces extending at a blunt relatively non-wedging angle during the compressive action, said last named shoe having means thereof operative after a predetermined relative movement of said shoes for effecting movement in unison therewith of said shoe having the keen wedge face.

6. In a friction shock absorbing mechanism, the combination with a friction shell; of a spring resistance; and an expansible and collapsible friction unit within the shell and movable longitudinally thereof, said unit including friction shoes and a wedge subject to direct pressure in line with the axis of the shell during all parts of a compression stroke, said wedge having a plurality of wedge faces, one of which is extended at a relatively acute and another of which is extended at a relatively blunt angle with respect to the line of applied force, the friction shoes having cooperating corresponding faces, and said shoes also having inter-engaging normally spaced apart shoulders thereon adapted to effect inward movement of all of said shoes in unison after a predetermined spreading action of said shoes has been effected.

7. In a friction shock absorbing mechanism, the combination with a friction member provided with longitudinally extending friction surfaces; of a spring resistance; friction elements having also longitudinally extending friction surfaces cooperable with the friction surfaces of said member, one element having a face inclined at a keen wedge angle relatively to the axis of said member, and another element having a face inclined at a relatively obtuse releasing angle relative to the axis of said member; and a one piece member having inclined faces coacting directly with said inclined faces of said elements, said elements being provided with co-acting abutment shoulders normally spaced apart and adapted to come into engagement after a predetemined relative movement thereof to effect movement of said element having the keen wedge face longitudinally inwardly of the shell in unison with said element having the obtuse face.

8. In a friction shock absorbing mechanism, the combination with a friction shell having inwardly converging friction surfaces of a spring resistance; a plurality of friction wedge shoes co-acting with said shell friction surfaces, one of said shoes having the wedge faces thereof extending at a relatively keen angle with reference to the longitudinal axis of the mechanism and the remaining shoes having the wedge faces thereof extending at relatively blunt angles to said axis; shoulders on said blunt angle shoes adapted to engage said keen shoe and move the same inwardly of the shell, said shoulders being normally spaced from said keen shoe; and a pressure transmitting wedge having a plurality of faces co-acting respectively with and correspondingly inclined to the faces of said shoes, whereby upon movement of said wedge inwardly of the shell, the blunt shoes will be advanced longitudinally inwardly of the shell relative to said keen angle shoe and bring the shoulders thereof into engagement with the keen shoe thereafter positively moving the same in unison therewith.

In witness that I claim the foregoing I have hereunto subscribed my name this 30th day of July, 1923.

JOHN F. O'CONNOR.

Witnesses:
FRANCES SAVAGE,
ANN BAKER.